US005665508A

United States Patent [19]

Inagaki et al.

[11] Patent Number: 5,665,508

[45] Date of Patent: Sep. 9, 1997

[54] ELECTROPHOTOGRAPHY CARRIER HAVING DOMAINS DISPERSED IN A MATRIX RESIN WITH A DISPERSION ASSISTANT INTERPOSED

[75] Inventors: Sanji Inagaki, Toyokawa; Shoichi Tsuge, Okazaki; Mineyuki Sako, Toyohashi; Kenzo Toya, Okazaki; Takashi Akazawa, Machida, all of Japan

[73] Assignee: Minolta Camera Kabushiki Kaisha, Osaka, Japan

[21] Appl. No.: 282,478

[22] Filed: Jul. 29, 1994

Related U.S. Application Data

[63] Continuation of Ser. No. 916,678, Jul. 22, 1992, abandoned.

[30] Foreign Application Priority Data

| | | | |
|---|---|---|---|
| Jul. 23, 1991 | [JP] | Japan | 3-182359 |
| Jul. 23, 1991 | [JP] | Japan | 3-182360 |
| Jul. 23, 1991 | [JP] | Japan | 3-182362 |
| Mar. 26, 1992 | [JP] | Japan | 4-068277 |

[51] Int. Cl.$^6$ ..................... G03G 9/00; G03G 9/083; B32B 5/16; C04B 35/04

[52] U.S. Cl. ..................... 430/108; 430/106.6; 428/402; 252/62.54; 524/435

[58] Field of Search ..................... 430/108, 106.6; 428/402; 252/62.54; 524/435

[56] References Cited

U.S. PATENT DOCUMENTS

| | | | |
|---|---|---|---|
| 3,974,078 | 8/1976 | Crystal | 430/138 X |
| 4,297,427 | 10/1981 | Williams et al. | 430/108 |
| 4,791,041 | 12/1988 | Aoki et al. | 430/108 |
| 5,071,725 | 12/1991 | Kubo et al. | 430/108 |
| 5,194,356 | 3/1993 | Sacripante et al. | 430/106.6 |
| 5,229,242 | 7/1993 | Mahabadi et al. | 430/106.6 |
| 5,318,871 | 6/1994 | Inagaki et al. | 430/108 X |
| 5,407,769 | 4/1995 | Hosono | 430/106.6 |

FOREIGN PATENT DOCUMENTS

| | | |
|---|---|---|
| 60-156394 | 7/1985 | Japan . |
| 62-290086 | 11/1987 | Japan . |
| 63-317240 | 12/1988 | Japan . |

*Primary Examiner*—George F. Lesmes
*Assistant Examiner*—Bernard P. Codd
*Attorney, Agent, or Firm*—Burns, Doane, Swecker & Mathis, LLP

[57] ABSTRACT

This invention relates to a developer for electrophotography comprising:

a domain resin phase containing specified additives, a matrix resin phase containing specified additives and a dispersion assistant, the matrix resin having a low compatibility with the domain resin, and the dispersion assistant having a compatibility with both of the domain resin and matrix resin and an Izod impact value higher than the matrix resin.

18 Claims, 3 Drawing Sheets

ELECTROPHOTOGRAPHY CARRIER HAVING DOMAINS DISPERSED IN A MATRIX RESIN WITH A DISPERSION ASSISTANT INTERPOSED

This application is a continuation of application Ser. No. 07/916,678, filed Jul. 22, 1992, now abandoned.

BACKGROUND OF THE INVENTION

The present invention relates to a developer for electrophotography which is composed of a domain resin containing specified additives and being dispersed in a matrix resin containing a specified additives. The present invention relates also to a method for producing the same. The present invention also relates to a developing method using the developer.

There is known a developer of two-component type and single component type. The two component type is composed of a toner and a carrier, The single component type is composed of a toner. The present invention includes both types of the developer.

With respect to a toner for electrophotography, there have been generally known the ones which are prepared by the steps of melting and kneading a matrix resin as a binder, a coloring agent, a charge controlling agent and, if necessary, magnetic particles, pulverizing the kneaded material, and classifying the pulverized material to give a uniform specified particle size distribution.

The charge controlling agent is contained in the toner particles and distributed irregularly on the surface of the toner when the toner is prepared by the method of pulverizing as noted above. As a frictional electrification amount of toner depends on the conditions of the toner surface, the charge controlling agent inside the toner particle can not work effectively. Therefore, almost all the added charge controlling agent is useless.

In order to avoid the problem mentioned above, a charge controlling agent is made to exist on the surface or near the surface of the toner. The charge controlling agent is adhered to the surface by means of mechanical impact or chemical adhesion after toner particles are prepared. In this technique, when toner particles are nearly spherical, the charge controlling agent may be adhered to the surface uniformly to a certain degree. When toner particles are irregular, the charge controlling agent can not be adhered uniformly to concave portions and convex portions. Therefore, the distribution and adhesion of the charge controlling agent are not uniform. There arise such problems as separation of the charge controlling agent and non-uniformity of electrification amount. Moreover, as a charge controlling agent is expensive, it is important not to waste the agent.

A toner may contain magnetic particles in order to avoid toner scattering or to form a mono-component magnetic toner. However, when magnetic toner particles are prepared conventionally by a kneading and pulverizing method, the dispersion of magnetic particles is not uniform and the magnetic particles are exposed on the surface of the toner. The non-uniform dispersion and the exposure of the magnetic particles influence adversely. Toner particles are poorly charged. Such poorly charged toner particles are liable to be scattered and cause toner fogs and pollution inside a copying machine. Further, as magnetic particles are liable to be influenced by moisture, the environmental resistance becomes poor and the lowering of electrification amount of toner is caused. Moreover, magnetic particles exposed from the surface may injure a photosensitive member when electrostatic latent images are developed. The problems mentioned above become more remarkable as the magnetic particles are contained more.

With respect to a two component developer composed of a toner and a carrier, there is known a carrier of binder type in which carrier cores are dispersed in an adequate binder resin in order to improve environmental stability, prevention from abrasion or damages of a photosensitive member. Such a conventional binder-type carrier is generally black or gray. When the carrier particles are adhered to copying paper, the quality of copy images are deteriorated.

SUMMARY OF THE INVENTION

The object of the present invention is to provide an irregular toner for electrophotography in which a charge controlling agent exist uniformly on the surface or near the surface of the toner and which is excellent in spent resistance and charging stability.

Another object of the present invention is to provide a toner containing magnetic particles uniformly dispersed therein and not exposed from the surface.

Another object of the present invention is to provide a carrier in which copy images are neither deteriorated nor influenced adversely in visual quality even when the carrier particles are developed.

Another object of this invention is to provide a method for producing a toner and a carrier above mentioned.

The present invention relates to a developer for electrophotography comprising:

a domain resin phase containing specified additives, a matrix resin phase containing specified additives and a dispersion assistant, the matrix resin having a low compatibility with the domain resin, and the dispersion assistant having a compatibility with both of the domain resin and matrix resin and an Izod impact value higher than the matrix resin.

The present invention also relates to a production method of the developer.

The present invention further provides a developing method by use of developer above mentioned.

DETAILED DESCRIPTION OF THE INVENTION

The present invention relates to a developer. The developer may comprise two components of a toner and a carrier or may be comprise single component of a toner.

First, a toner is explained hereinafter.

A toner for electrophotography of the present invention comprises at least;

a domain resin composition;

a matrix resin composition having a low compatibility with the domain resin; and a dispersion assistant having a compatibility with both the domain resin and the matrix resin and having an Izod impact value higher than that of the matrix resin, the domain resin composition being dispersed in the matrix resin with the dispersion assistant interposed, in which a charge controlling agent is added in a kneading process to incorporate substantially all the charge controlling agent uniformly in the matrix resin phase.

Figure 1:
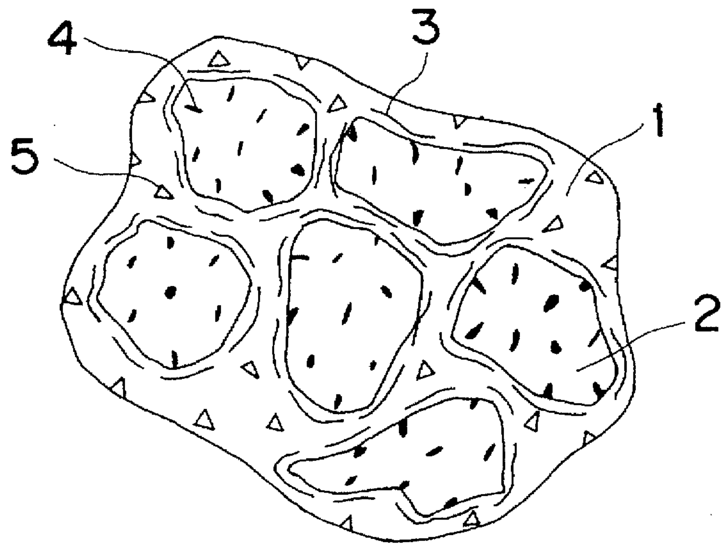
FIG. 1 is a schematic cross sectional view of a toner particle according to the present invention.

The constitution of a toner for electrophotography according to this invention can be recognized as shown schematically in FIG. 1. The toner is composed of a matrix resin (1), a domain resin (2) dispersed in the matrix resin phase, a coloring agent (4) existing in the domain resin phase and a dispersion assistant (3) existing between the domain resin phase and the matrix resin phase. A resin having a predetermined difference in impact resistivity is used for the dispersion assistant and matrix resin, by which the domain resin is effectively protected from being broken in the pulverizing process for producing the toner. Therefore, only the matrix resin phase is destroyed, and the surface portions of destroyed materials are substantially formed of the matrix resin phase. When a charge controlling agent is dispersed in the matrix resin phase before the pulverizing process, the charge controlling agent comes to exist on the surface or near the surface of the toner at high possibility. The characteristics of frictional electrification depend much on the conditions of toner surface. According to the present invention, the charge controlling agent is made to exist substantially all on the surface or near the surface of the toner, the added charge controlling agent functions effectively. It is possible to decrease the addition amount of the charge controlling agent.

Further, the addition of a charge controlling agent in the pulverizing process makes it possible for the charge controlling agent to exist uniformly even though the shape of toner particles is irregular when compared with a method in which a charge controlling agent is adhered by use of mechanical impacts or chemical adhesion after production of toner particles.

Examples of the matrix resins of the toner for electrophotography are homopolymers or copolymers of α-olefin such as ethylene, propylene, butene-1, pentene-1, 4-methyl pentene-1 and hexene-1; block, random or graft copolymers of these α-olefin with other unsaturated compounds, wherein more than half weight of the polymer is composed of the former compounds; modified homo- or copolymers in which the above homo- or copolymers are subjected to halogenation, sulfonation or oxidation; acrylonitrile-styrene copolymers (AS resin); polycarbonates, thermoplastic polyesters, polyamides, polystyrenes, styrene.butadiene.styrene block copolymers, polyacrylonitriles, thermoplastic polymers like methyl polymethacrylates, and rubbers.

Other unsaturated compounds which can be copolymerized with α-olefin in the olefin polymers described above are, for example, vinyl esters like vinyl acetate, vinyl silanes such as vinyl methoxysilane and vinyl triacetoxysilane and ethylenic unsaturated monomers other than the α-olefin given by the examples described above.

Polyesters and polystyrenes, which are thermoplastic polymers to be used in this invention, are preferable as a matrix phase.

Polyesters which are preferably used in this invention are appropriately selected from the widely used polymers obtained by condensation polymerization of polybasic acids and polyfunctional alcohols.

Examples of polybasic acids are aromatic carboxylic acids such as terephthalic acid, isophthalic acid and trimellitic acid, aliphatic carboxylic acid such as adipic acid, hexahydroterephthalic acid, succinic acid, n-dodecenyl succinic acid, iso-dodecenyl succinic acid, n-dodecyl succinic acid, n-octyl succinic acid, iso-octyl succinic acid and n-butyl succinic acid, and unsaturated carboxylic acids such as maleic acid and fumaric acid, and their acid anhydrides. Polyfunctional alcohol components are exemplified by ethylene glycol, propyleneglycol, 1,4-butanediol, hexamethylene glycol, neopentyl glycol, 2,2,4,4-tetramethylene glycol, glycerine, trimethylolpropane, bisphenol A, hydrogenated bisphenol A, sorbitol or their etherified hydroxyl compounds such as polyoxyethylene(10)sorbitol, polyoxypropylene(5) glycerine, polyoxyethylene(4)-pentaerythritol, polyoxypropylene(2,2)-2,2-bis(4-hydroxyphenyl)propane and polyoxyethylene(2)-2,2-bis(4-hydroxyphenyl)propane.

Polyesters by which the effect of this invention is most predominant are those soluble in solvents. Non-crystalline or low crystalline polymers, especially those having a crystallinity of less than 5 percents as measured by X-ray analysis have a large effect. Polymers having a softening point of 40° to 150° C., especially from 60° to 150° C., and a number average molecular weight of 500 to 40000, especially from 1000 to 30000, have a large effect.

Polystyrenes which are preferably used in this invention are thermoplastic resins of polystyrenes. The polystyrenes may be a homopolymer of styrene, methylstyrene, dimethylstyrene, ethylstyrene, isopropylstyrene, chlorostyrene, α-methylstyrene or α-ethylstyrene, or a copolymer thereof with other polymerizable monomers. Such other polymerizable monomers are unsaturated carboxylic acids or the derivatives thereof which are exemplified by unsaturated carboxylic acid such as acrylic acid, methacrylic acid, maleic acid and itaconic acid, unsaturated carboxylates such as methyl acrylate, ethyl acrylate, 2-ethylhexyl methacrylate, butyl acrylate, methyl acrylate, methyl methacrylate, ethyl methacrylate, n-butyl methacrylate, dibutyl fumarate and dioctyl fumarate, unsaturated anhydrides such as maleic anhydride and itaconic anhydride, acid derivatives such as acrylonitrile, and derivatives thereof. Among these polystyrenes, a copolymer composed of 50 percents by weight or more of styrenes and 50 percents by weight or less of unsaturated carboxylic monomers or derivatives thereof is preferable because a pulverizing process can be more effectively carried out. Such a copolymer may be a terpolymer as well as binary polymer. In the case of ternary polymer, a polymerizable monomer such as ethylene, propylene, hexene, polyenes such as butadiene and isopropene, vinyl esters such as vinyl acetates, vinyl silanes such as vinyltrimethoxysilane and vinyltriethoxysilane are used in addition to the styrenes and the unsaturated carboxylic acids or the derivatives thereof. Among them, polymers having a glass transition temperature of 30° to 105° C. and a number average molecular weight of 1000 to 150000, especially from 2000 to 100000, have a large effect.

Solvent soluble polymers are preferable as polystyrenes to be used in this invention.

Since these matrix resins may exist in an amount sufficient for coating the dispersed domain resin, they can be used in a wide range relative to the toner. Therefore, it is usually preferable to use the resin in an amount of 10 to 99 percents by weight relative to the toner resin, and the amount of 30 to 95 percents by weight is more preferable. When the amount is less than the range described above, the matrix resin phase and domain resin phase are inverted with each other. It becomes difficult to make charge a controlling agent exist on the surface or near the surface of toner. The resins containing the coloring agent are exposed on the pulverized surface. Thereby there arise such problems as deficiencies in electrification, the decrease of production efficiency caused by a broad particle size distribution because of over-pulverization of toner. When the amount is larger than the range described above, it causes a mal-dispersion of the coloring agent in the matrix resin.

In a toner of the present invention, a charge controlling agent is dispersed and kept in a matrix resin as described above.

A conventional charge controlling agent such as positive charge controlling agent and negative charge controlling agent, for example, used in a toner for dry developing method may be used. In embodiment, the positive charge controlling agent is exemplified by electron-donating dyes such as nigrosines etc., quaternary ammonium salts, alkoxylated amines and alkylamides. The negative charge controlling agent is exemplified by electron accepting dyes such as metal complexes (for example monoazo dyes), chlorinated organic compounds and metal salts of aliphatic acids.

When a color toner is prepared, colorless or transparent charge controlling agents are used. Thereby electrical charges can be controlled without deterioration of effects of coloring agent in the domain phase.

The addition amount of the charge controlling agent is within the range of 0.01–70 percents by weight, preferably 0.5–20 percents by weight, more preferably 1–10 percents by weight on the basis of the matrix resin. If the amount is less than 0.01 percent by weight, charge controlling effects can not be obtained and electrification-build-up properties and stability become poor. The amount larger than 70 percents by weight causes poor dispersion of the charge controlling agent, increase of amount of spent carrier and instability of electrification.

Resins similar to the matrix resins described above can be applied to the domain resins. It is not always necessary that the domain resin is the same kind resin as that of the matrix resin. When polystyrenes are used as the matrix resin, polystyrenes which are the same kind resin as that used as the matrix resin may be used or polyesters which are different kind resin from that used as the matrix resin may be used. It is, however, necessary, that the resins the compatibility of which are modified by changing co-monomers to be copolymerized and which are made not to mix homogeneously with each other are used. Thereby, the domain resin is dispersed in the matrix resin.

The coloring agent is dispersed and retained in the domain resin in the toner, and this domain resin is dispersed in the matrix resin. The coloring agent is prevented from exposing on the toner surface and an effect to give uniform electrification ability on the toner surface is attained by dispersing and retaining the coloring agent in the domain resin. Bleeding of colors is also prevented when the domain resin containing the coloring agent dispersed and retained therein is dispersed uniformly in the matrix resin.

In other words, the matrix resin and domain resin in the toner composition according to this invention are the resins which do not mix homogeneously with each other, and the resin having better compatibility with the coloring agent to be used works as a domain resin. The matrix resin phase comprises a charge controlling agent.

The dispersion assistant to be used for the toner for electrophotography according to this invention is composed of a copolymer comprising the domain resin component and matrix resin component. The polymer obtained by graft-copolymerization of a monomer composing the domain resin or matrix resin with a monomer composing the other resin is preferable.

The dispersion assistant to be used in this invention works to disperse the domain resin finely in the matrix resin. The amount of 1 percent by weight at least in the toner composition is sufficient to disperse domain phase finely and homogeneously. The use of more than 3 percents by weight is preferable.

The dispersion assistant having an Izod impact value of 0.1 kgf.cm/cm higher or more, preferably 0.2 kgf.cm/cm higher or more and more preferably 0.3 kgf.cm/cm higher or more than that of the matrix resin is used. The composite is preferentially broken at the matrix phase during the pulverizing process, thereby preventing the domain resin from being broken. Thus, a charge controlling agent exists in exposed conditions from the surface or near the surface and so the charge controlling agent can be used more effectively. Further, mal-effects arising from the coloring agent exposed on the toner surface can be prevented because the coloring agent remains to be sealed up in the domain resin phase. When Izod impact value is less than the above-described range, the domain resin tends to suffer from a stress and the resin is liable to be broken easily. Destruction of the domain resin causes a mal-effect due to an exposure of the coloring agent, and the production efficiency is largely reduced since the resin tends to be over-pulverized and the particle size distribution is made wide.

Izod impact value in this invention is expressed by the value as measured by using Mini-max Izod testing machine (Model CS-183; made by Instrument Co.). A test piece of 30×12×2.0 (mm) is prepared by a press molding (molding condition: 130° C., 60 to 70 kg/cm$^2$), and this test piece is subjected to a test by the testing machine described above.

Methods for graft reaction of polystyrenes with vinyl monomers are exemplified by (1) a method of adding a vinyl monomer into a solution containing a polymer dissolved therein and allowing to react, (2) a method for allowing to react by dissolving a polymer in a vinyl monomer, (3) a method of suspending polymer particles in water and adding a vinyl monomers to the suspended solution to be incorporated in the polymer particles, followed by allowing to react, (4) a method for allowing to react in a condition in which a solution of a polymer in a vinyl monomer is dispersed in water as droplets, (5) a method for allowing to treat a melted polymer with a vinyl monomer or (6) a graft polymerization method by irradiation. Among the methods, methods (3) and (4) are preferable. The matrix resin and domain resin are simultaneously formed and involved in the polymers obtained by methods (3) or (4), and the polymer is available for use without adding the matrix resin or domain resin independently.

Polymerization initiators are usually added in these reaction above mentioned. While polymerization initiators generally used for radical polymerization can be also used, it is preferable to select initiators from those having their decomposition temperature of 45° to 110° C., especially from 50° to 105° C., by taking the polymerization temperature into account. The decomposition temperature mentioned here means such a temperature that the decomposition ratio of the radical generating agent becomes equal to 50 percents after 0.1 mole of the polymerization initiator is added in one litter of benzene to be allowed to stand for 10 hours.

Examples of such initiators are organic peroxides such as 2,4-dichlorobenzoylperoxide (54° C.) (where the temperature in the parenthesis indicates a decomposition temperature), tert-butyl-peroxypivalate (56° C.), o-methylbenzoylperoxide (57° C.), bis-3,5,5-trimethylhexanoylperoxide (60° C.), octanoylperoxide (61° C.), lauroylperoxide (62° C.), benzoylperoxide (74° C.), tert-butylperoxy-2-ethyl hexanoate (74° C.), 1,1-bis(tert-butylperoxy)-3,5,5-trimethylcyclohexane (91° C.), cyclohexanone peroxide (97° C.), 2.5-dimethyl-2,5-dibenzoylperoxyhexane (100° C.), tert-butylperoxybenzoate (104° C.), di-tert-butyl-diperoxyphthalate (105° C.), methylethylketone peroxide (109° C.), dicumylperoxide (117° C.) and dicumyt-tert-butylperoxide. These compounds can be also used together with each other.

The amount of the polymerization initiators to be used is in the range from 0.05 to 30 percents by weight, preferably from 1 to 10 percents by weight relative to vinyl monomers.

The dispersion assistant can be also obtained by "in situ" graft polymerization of the monomers which are able to give the matrix resins (polyester, for example) and domain resins (polystyrenes, for example) in this invention.

The coloring agents to be used for the toner for electrophotography in this invention are exemplified by carbon black, basic dyes like Rhodamine B, acidic dyes, fluorescent dyes, azo dyes, anthraquinone dyes, azine dyes, Nigrosine dyes and metal complex dyes, in addition to rouge, titanium oxide, Cadmium Yellow, Cadmium Red, basic dye lake and phthalocyanine dyes. The amount of addition of these coloring agents is usually in the range of 0.05 to 50 percents by weight, preferably in the range of 0.1 to 20 percents by weight.

Coloring agents having a larger affinity to domain resins than that to matrix resin are used because substantially all the amount of the coloring agent is required to be dispersed and filled in the domain resin.

Olefin polymers of low molecular weight, colloidal silica, fatty acids or metal salts of fatty acids may be further added to toner according to this invention for the purpose of improving its fluidity and release properties.

When a magnetic toner is produced, magnetic particles are added in the domain resin phase. The magnetic particles are sealed up in the domain resin and not exposed on the surface of toner. Therefore, stability of electrification and environmental stability, in particular, humidity resistance can be improved.

Magnetic particles added in the domain resin are not particularly limited. Known materials can be used. For example, magnetite (iron oxide ($Fe_3O_4$)) which is black and also works as a coloring agent is used when a black toner is desired. The magnetic particles which are not black or pale black are used when a color toner is desired. Typical examples of magnetic materials are, for example, ferromagnetic materials such as cobalt, iron and nickel, alloy or mixture of metals such as aluminum, cobalt, iron, lead, magnesium, nickel, lead, antimony, beryllium, bismuth, cadmium, calcium, manganese, selenium, titanium, tungsten, vanadium, oxides thereof and sintered particles thereof (ferrite).

A particle size of the magnetic particles is smaller than domain resin phase, concretely, 0.1–3.0 μm, preferably 0.3–1.5 μm, more preferably 0.5–1.0 μm in mean particle size. If the mean particle size is less than 0.1 μm, the aggregation of magnetic particles may occur. If the mean particle size is more than 3.0 μm, the magnetic particles may be exposed.

When a toner is used as a component of two-component developer, the addition amount of the magnetic particles is within 0.5–30 percents by weight, preferably 2–15 percents by weight on the basis of total amount of toner. If the amount is less than 0.5 percents by weight, the magnetic force of toner is insufficient and so toner particles may scatter. If the amount is larger than 30 percents by weight, the magnetic force is so strong that satisfactory density of copy images can not be obtained. Further, fixing properties may become poor.

When the present invention is applied to a single-component magnetic toner, the addition amount of the magnetic particles is within 20–65 percents by weight, preferably 30–50 percents by weight on the basis of total amount of toner. If the amount is less than 20 percents by weight, the magnetic force is insufficient, and the transportation of toner particles can not be carried out so smoothly. The amount is larger than 65 percents by weight, fixing properties become poor.

It is preferable that the magnetic particles are coated with a domain resin. The affinity of magnetic particles with the domain resin is improved. The magnetic particles are sealed up more reliably in the domain resin phase when kneaded with a matrix resin.

With respect to a coating method, a dipping method and a spraying method may be used. Coating layer may be formed by polymerizing monomer components for domain resin on the surface of magnetic particles.

With respect to the production method of a toner according to this invention, a kneaded material which is prepared by melting and kneading a domain resin, a coloring agent and, if desired, magnetic particles in a definite amount described above is first obtained. Kneading can be usually carried out by using a conventional roller, kneader or extruder.

On the other hand, a kneaded material which is prepared by melting and kneading a matrix resin and a charge controlling agent in a definite amount described above is obtained.

A colored composite is then obtained by melting and kneading the both kneaded materials and a dispersion assistant in a definite amount described above.

The domain resin containing the coloring agent is finely and homogeneously dispersed in the matrix resin containing the charge controlling agent. Such a homogeneous dispersion system can be formed by an appropriate selection of the characteristics of the composition components (molecular weight, molecular weight distribution, copolymerization ratio, randomness, electric characteristics, compatibility and affinity) and mixing conditions (apparatus, temperature, kneading rate and time).

In general, the preferable size of the dispersed phase of the domain resin in the matrix resin is 5 μm or less. The particle size mentioned here is the primary mean particle size (Martin's diameter) on the cross section of a sample as observed by an electron microscope.

Finally, the matrix colored composition in which the domain resin phase is dispersed is pulverized and classified. Particles the surface of which is substantially covered with the matrix resin can be obtained according to this invention because the resin is pulverized while the stress is concentrated on the matrix resin. Moreover, particle size distribution of the pulverized material becomes sharp. High classification efficiency is achieved. Exposure of a coloring agent or a magnetic material is suppressed and that the charge controlling agent exists on the surface or near the surface. Therefore, electrification efficiency of toner is improved. Electrification stability and improvement of environmental resistance can be also achieved.

Figure 3:
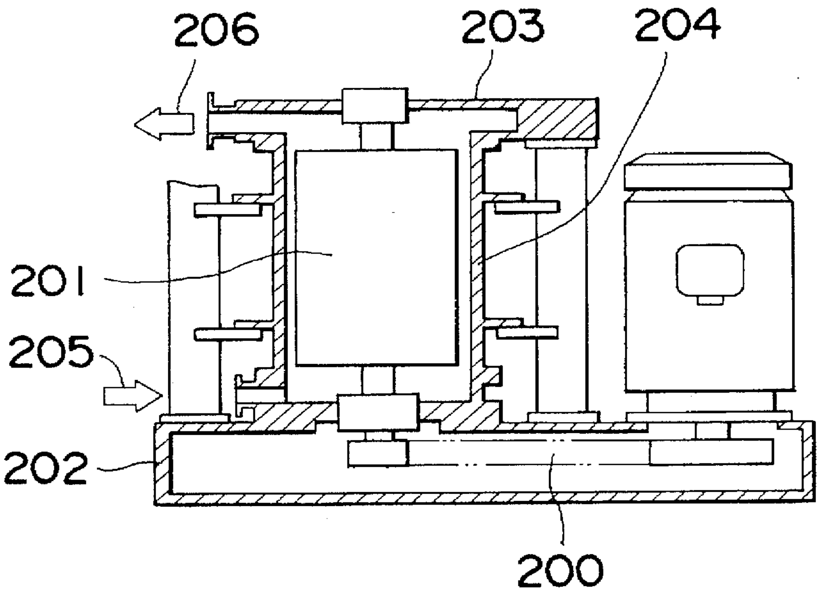
FIG. 3 is a schematic cross sectional view of a low impact type pulverizing machine (Cryptton pulverizing machine).

Pulverizing can be carried out by means of a jet mill, hammer mill or pin mill. It is preferable to use a low-impact pulverizing method like a Cryptron crusher (made by Kawasaki Heavy Industries, Ltd. FIG. 3) to impart a pulverizing stress effectively to the matrix resin phase and improve the classification yield. The Cryptron crusher (FIG. 3) is a vertically installed crusher of a high speed rotation type which is composed of a rotor (201) driven by a V-shaped belt (200), an inlet casing (202), an outlet casing (203) and a stator (204) attached with a liner having a lot of slots on the surface. The raw material sucked into the inlet (205) together with air is at first scattered uniformly along the outer periphery by the rotor rotating at a high speed, and then is drawn into a vigorous whirlpool generated between a special-shaped rotor blade and liner blade to be instantaneously pulverized and the pulverized material is discharged from an exhaust port (206) outside.

Fine particles the surface of which is covered with the matrix resin containing a charge controlling agent on the surface thereof or near the surface (the coloring agent is not observed at all or slightly observed) can be produced in high classifying efficiency by the method described above.

Toner particle size is generally adjusted to 5–20 μm in mean particle size. A fine toner having mean particle size of less than 10 μm can be produced at high efficiency. Such a fine toner is useful in formation of copy images excellent in distinction.

It is, of course, also possible to control various characteristics by adding other additives such as fluidization agents appropriately in the matrix resin or domain resin although the main object of this invention is to improve classification yield efficiency of electrification and stabilization of electrification by containing charge controlling agents on the surface or near the surface of toner and by preventing coloring agents from being exposed from the view point of the destructive property. These embodiments are also included in this invention.

Then, a carrier is explained hereinafter.

Figure 2:
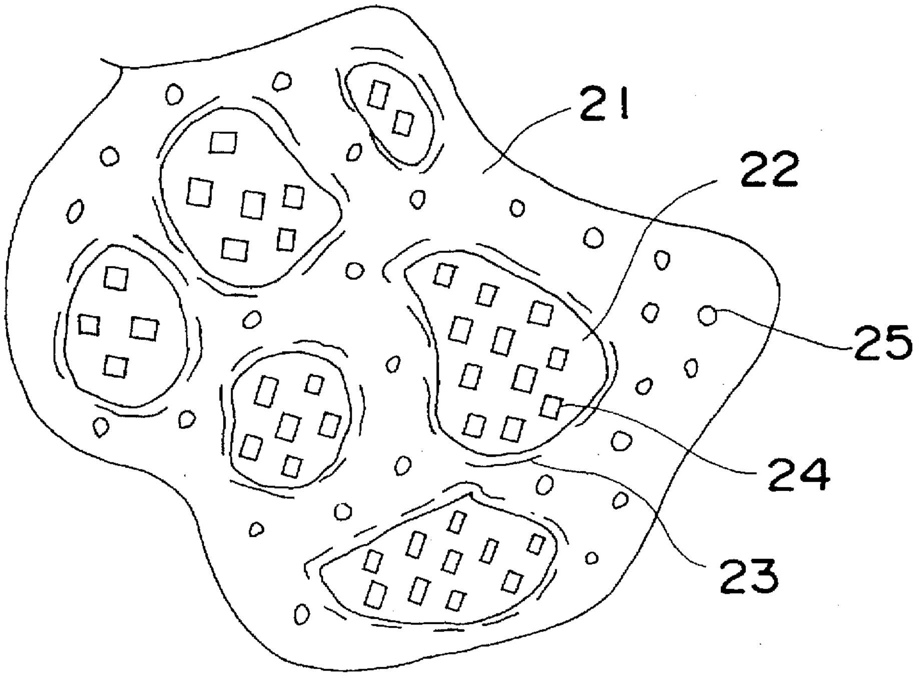
FIG. 2 is a schematic cross sectional view of a carrier particle according to the present invention.

The constitution of a carrier for electrophotography according to this invention can be recognized as shown schematically in FIG. 2. The carrier is composed of a matrix resin (21) containing at least a coloring agent (25), a domain resin (22) dispersed in the matrix resin phase, a magnetic particle (24) existing in the domain resin phase and a dispersion assistant (23) existing between the domain resin phase and matrix resin phase. The domain resin phase is partially or all covered with the dispersion assistant. The same matrix resin, domain resin and dispersion assistant as those used for preparing a toner above mentioned may be used. Thereby the destruction of the domain resins is effectively prevented in a pulverizing process. As a result, the magnetic particles (24) can be sealed up in the domain resin phase (22). Even though carrier particles are developed, the magnetic particles are covered and hidden with the matrix resin. Therefore, the influence of color of magnetic particles is suppressed by the coloring agent (25). Further, the dispersion assistant phase prevents carrier particles from being over pulverized. High production efficiency can be achieved. The frictional electrification properties become stable as the magnetic particles are not exposed. The carrier particles come to show high electrical resistance as the magnetic particles having low electrical resistance are almost sealed up. The development of carrier particles caused by injection of electrical charges can be prevented. The carrier particles can generate magnetic forces uniformly as the magnetic particles are uniformly dispersed.

Since these matrix resins may exist in an amount sufficient for coating the dispersed domain resin, they can be used in a wide range relative to the carrier. Therefore, it is usually preferable to use the resin in an amount of 5 to 40 percents by weight, preferably 10–30 percents by weight relative to the toner resin. When the amount is less than the range described above, the matrix resin phase and domain resin phase are inverted with each other. The resin containing the magnetic materials is exposed on the pulverized surface. The black-gray color cannot be hidden effectively. There are also such problems as the decrease of production efficiency caused by a broad particle size distribution because of over-pulverization of toner. When the amount is larger than the range described above, it causes a mal-dispersion of the magnetic materials into the matrix resin.

With respect to coloring agents dispersed in matrix resin, various kinds of pigments and dyes (white, yellow, red, blue, green, black) may be used. As copy paper is usually white, white pigments and white dyes are preferably used. When coloring agents other than white coloring agents, for example, a blue coloring agent is used to form a carrier of the invention, the carrier is useful for a blue toner. The deterioration of visual image quality can be prevent effectively.

All the substantial amount of coloring agents is dispersed in matrix resin, so the coloring agents are selected from the ones having higher affinity with a matrix resin than that with a domain resin.

Concrete examples of coloring agents are shown below;

white: $TiO_2$, red oxide;

yellow: cadmium yellow, Hansa yellow, benzidine yellow: chrome yellow;

red: cadmium red; toluidine red 4R; lake red C; brilliant carmine 6B;

blue: phthalocyanine blue; victoria blue PTA lake; Prussian blue;

green: phthalocyanine green;

black: carbon black, nigrosine dye.

The coloring agent added in the matrix resin is the one having primary particle size of 0.05–0.5 μm, preferably 0.1–0.3 μm. If the primary particle size is smaller than 0.05 μm, the original color tone can not be reproduced. If the size is larger than 0.5 μm, the hiding power is weakened.

The usage of the coloring agent is within the range of 40–65 percents by weight, preferably 45–60 percents by weight on the basis of matrix resin phase. The amount is larger than 65 percents by weight, it becomes difficult to knead a coloring agent and a matrix resin. If the amount is smaller than 45 percents by weight, sufficient degree of pigmentation can not be obtained. Adverse influences are caused by the black or gray color of magnetic particles.

Magnetic particles added in the domain resin are not particularly limited. Known materials can be used. Typical examples of magnetic materials are, for example, ferromagnetic materials such as cobalt, iron and nickel, alloy or mixture of metals such as aluminum, cobalt, iron, lead, magnesium, nickel, lead, antimony, beryllium, bismuth, cadmium, calcium, manganese, selenium, titanium, tungsten, vanadium, oxides thereof and sintered particles thereof (ferrite).

A particle size of the magnetic particles is smaller than domain resin phase, concretely, 0.1–3.0 μm, preferably 0.3–1.5 μm in mean particle size. If the mean particle size is less than 0.1 μm, the aggregation of magnetic particles may occur. If the mean particle size is more than 3.0 μm, the magnetic particles may not be hidden sufficiently.

The addition amount of the magnetic particles is within 30–90 percents by weight, preferably 60–90 percents by weight on the basis of total amount of carrier. If the amount is less than 30 percents by weight, the transporting ability by magnetic force decreases. The amount is larger than 90 percents by weight, it becomes difficult to knead the carrier composition. The production efficiency becomes low.

It is preferable that the magnetic particles are coated with a domain resin. The affinity of magnetic particles with the domain resin is improved. The magnetic particles are sealed up more reliably in the domain resin phase when kneaded with a matrix resin.

With respect to a coating method, a dipping method and a spraying method may be used. Coating layer may be formed by polymerizing monomer components for domain resin on the surface of magnetic particles.

The dispersion assistant to be used in this invention works to disperse the domain resin finely in the matrix resin. The amount of 0.5 percents by weight at least in the carrier composition is sufficient to disperse domain phases finely and homogeneously. The use of more than 1.5 percents by weight is preferable. More preferable amount is 3 percents by weight.

With respect to the production process of carrier, a kneaded material which is prepared by melting and kneading a domain resin, magnetic particles in a definite amount described above is first obtained. On the other hand, a kneaded material which is prepared by melting and kneading a matrix resin, a charge controlling agent and a coloring agent in a definite amount described above is obtained. Kneading can be usually carried out by using a conventional roller, kneader or extruder.

A colored composition is then obtained by melting and kneading the kneaded material containing the magnetic materials, the kneaded material containing the coloring agent and a dispersion assistant in a definite amount described above.

The domain resin containing the magnetic particles is finely and homogeneously dispersed in the matrix resin. Such a uniform dispersion system can be formed by an appropriate selection of the characteristics of the composition components (molecular weight, molecular weight distribution, copolymerization ratio, randomness, electric characteristics, compatibility and affinity) and mixing conditions (apparatus, temperature, kneading rate and time).

In general, the preferable size of the dispersed phase of the domain resin in the matrix resin is 5 μm or less. The particle size mentioned here is the primary mean particle size (Martin's diameter) on the cross section of a sample as observed by an electron microscope.

Finally, the matrix colored composition in which the domain resin phase is dispersed is pulverized and classified. The pulverized particles the surface of which is substantially covered with the matrix resin can be obtained according to this invention because the resin is pulverized while the stress is concentrated on the matrix resin. Moreover, particle size distribution of the pulverized particles becomes sharp. A high classification efficiency is achieved. The magnetic particles are dispersed in the domain resin and so substantially coated with the matrix resin. Therefore, no or few magnetic particles are exposed on the surface of the toner.

The same pulverizing method as that described in the production method of a toner can be applied to prepare the carrier of the present invention.

A carrier obtained as above mentioned may be mixed with a toner at a conventional ratio (about 8 percents by weight of toner) to prepare a two component developer. The toner may be the conventional ones or the ones prepared according to the present invention as above mentioned.

In a developing method using a two component developer containing a toner and a carrier, the carrier is mixed and stirred to charge the toner frictionally and transports the toner to a developing zone of electrostatic latent images. In the developing zone, only the toner particles are consumed to develop the electrostatic latent images. When the carrier particles are developed to the electrostatic latent images, black spots of carrier particles may be formed on copy paper. Such spots deteriorate the visual copy quality. Accordingly, various types of carriers are proposed and reformed in a two component developer so that carrier particles may not be developed.

When a carrier is used for a long time, magnetic force may be reduced or lost and toner particles adhere to the surface of carrier, so that a resin layer is formed on the surface thereof (so called "spent phenomenon"). Therefore, all the carrier particles need to be taken out and exchanged for a new carrier after a specified time.

In order to save such a maintenance, it is proposed that carrier particles are collected gradually by developing only carrier particles onto a photosensitive member while a copying process is repeated. But, the flow of copying process is interrupted during the collection process of carrier.

The defects above mentioned can be solved by using a white or pale carrier, spending the same a little continuously and replenishing a developing machine with a starting developer composed of the same carrier.

In this developing method, a carrier contains a white or pale coloring agent in a domain resin phase (22). Even though the white or pale carrier particles are developed a little on copy paper, there is no visual problem because the magnetic particles are hidden with the matrix resin. Further, because the carrier particles are electrically charged in opposite polarity to the toner, they are developed on the background of the copy paper and so copy images are not deteriorated.

The present application also includes a developing method a developing method characterized by using a white or pale carrier, spending the same a little continuously and replenishing a developing machine with a starting developer composed of the same carrier.

A consuming amount is adjusted within the range of 1–5 mg, preferably 3–4 mg a sheet of manuscript (A4) having white-black ratio of 12%. If the consuming amount is larger than 5 mg, the copying costs becomes expensive. If the amount is smaller than 1 mg, the carrier particles are polluted to form fogs. The image quality is deteriorated.

The adjustment of the carrier consumption is made by (1) raising avias voltage applied to a developer-transporting sleeve (the vias voltage (about 150 V in usual) is raised to 200 V), (2) increasing a transporting amount of a developer, or (3) weakening magnetic force of magnets inside a developer-transporting sleeve. The adjustment method (1) is preferable because of easiness and convenience.

In the developing method, a toner and a carrier are consumed while a copying process is repeated. A toner-supplying means is applied. For example, the content of toner is detected by a sensor to keep its content about 8 percents by weight because the toner is consumed more than carrier.

When the copying process is further repeated and the toner particles and the carrier particles are consumed, the amount of the developer itself decreases. Then, a developer containing a toner and a carrier is supplied. This developer for replenishment may be the same as a starting developer for a copying machine. The starting developer means a developer placed first in a developing machine containing a toner at a content of about 8 percents by weight.

It is adjusted individually in dependence on a type or a size of the developing machine how much the developer is consumed and whether the developer for replenishment should be supplied or not. For example, when the amount of developer becomes low, the density of copy images may becomes non-uniform. Such a phenomenon may be a deciding factor to supply a developer.

An amount of the developer can be detected, for example, by means of a volume sensor of developer on the basis of the residual developer. The volume sensor of developer is a sensor which sends a signal to supply a predetermined amount of developer when the amount of developer in a developing machine is reduced to a certain level.

In the present invention, a copying process can be continued by an easy means such as a developer is supplied. A troublesome maintenance of carrier exchange is not needed.

Although this invention is described in detail referring to the examples, it is not intended that the scope of this invention is not limited by the examples referred hereinafter.

TONER

The domain resins, matrix resins and dispersion assistants used in the examples are shown below.

Domain Resin T

Styrene-acrylic acid ester copolymer

Molecular weight: 53000

Izod impact strength: 0.51 (kgf.cm/cm)

Matrix Resin T styrene-maleic anhydride copolymer

Molecular weight: 10000

Izod impact strength: 0.17 (kgf.cm/cm)

Dispersion Assistant T

Reformed styrene polymer

Izod impact strength: 0.41 (kgf.cm/cm)

REFERENCE EXAMPLE 1 (production of the dispersion assistant resin)

An aqueous medium was prepared in an autoclave of net volume of 10 litters by adding 4 kg of water, 80 g of tricalcium phosphate and 0.12 g of sodium dodecylbenzene sulfonate, and a solution prepared by dissolving 8 g of "NYPER B" in a mixed solution of 640 g of styrene and 160 g of n-butyl acrylate was added to the aqueous medium followed by stirring. After placing 1200 g of above-described matrix resin (styrene copolymer) particles into the solution and replacing the interior of the autoclave with nitrogen, the temperature inside the reaction system was raised to 60° C. and, while keeping the temperature for 3 hours, the matrix resin particles were integrated with styrene containing the polymerization initiator described above.

Then, 11.4 g of "PERBUTYL PV" was placed into this suspension and, after raising the system temperature to 65° C. and keeping the temperature for 2 hours, polymerization of the surface of styrene polymer particles was allowed to start. Polymerization was completed by raising the temperature of the reaction system to 90° C. and keeping the temperature for 3 hours.

After cooling, the substance in the reaction system was taken out and was subjected to washing with acid and water, thereby giving 2 kg of the dispersion assistant resin.

Example T1

Forty parts by weight of the domain resin and 5 parts by weight of carbon black were melted and kneaded by a two-axis kneading and extruding machine.

Then, 55 parts by weight of matrix resin, 1 part by weight of a charge controlling agent (Nigrosine base) were melted and kneaded by a two-axis kneading and extruding machine.

A colored composition was obtained by melting and kneading 45 parts by weight of this kneaded domain resin, 55 parts by weight of the kneaded matrix resin and 8 parts by weight of the dispersion assistant by using a two-axis kneading and extruding machine.

A portion of this colored composition was placed between a piece of slide glass and cover glass. A thin film was formed by heating and melting on a hot plate, and the sample was investigated by a transmission type optical microscope. An existence of a colored dispersion phase was observed and its particles size was found to be 0.5 to 1.0 μm. Any coloring agent was not observed in the matrix.

In order to observe the dispersion conditions of the charge controlling agent, a kneaded material was prepared similarly as above except that carbon black was not added. A portion of this composition was placed between a piece of slide glass and cover glass. A thin film was formed by heating and melting on a hot plate, and the sample was investigated by a transmission type optical microscope. An existence of the charge controlling agent was found in only a matrix resin phase.

Then, the colored material was finely pulverized by a jet mill and classified to give a toner with a mean particle size of 8.0 μm. The yield of classification was 75 percents.

Comparative Example T1

Forty parts by weight of the domain resin, 5 parts by weight of carbon black and 1 part by weight of a charge controlling agent (Nigrosine base) were melted and kneaded by a two-axis kneading and extruding machine.

A colored composition was obtained by melting and kneading 45 parts by weight of this kneaded material, 55 parts by weight of the matrix resin and 8 parts by weight of the dispersion assistant by using a two-axis kneading and extruding machine.

A portion of this colored composition was placed between a piece of slide glass and cover glass. A thin film was formed by heating and melting on a hot plate, and the sample was investigated by a transmission type optical microscope. An existence of a colored dispersion phase was observed and its particles size was found to be 0.5 to 1.0 μm. Neither coloring agent nor charge controlling agent was observed in the matrix.

Then, the colored material was finely pulverized by a jet mill and classified to give a toner with a mean particle size of 7.6 μm. The yield of classification was 73 percents.

Comparative Example T2

Forty parts by weight of the domain resin, 5 parts by weight of carbon black and a charge controlling agent (Nigrosine base) of 0.5 parts by weight were melted and kneaded by a two-axis kneading and extruding machine.

Then, 55 parts by weight of matrix resin, 0.5 part by weight of a charge controlling agent (Nigrosine base) were melted and kneaded by a two-axis kneading and extruding machine.

A colored composition was obtained by melting and kneading 45 parts by weight of this kneaded domain resin, 55 parts by weight of the kneaded matrix resin and 8 parts by weight of the dispersion assistant by using a two-axis kneading and extruding machine.

A portion of this colored composition was placed between a piece of slide glass and cover glass. A thin film was formed by heating and melting on a hot plate, and the sample was investigated by a transmission type optical microscope. An existence of a colored dispersion phase was observed and its particles size was found to be 0.5 to 1.0 μm. These dispersion phases were dispersed finely and uniformly in the matrix resin. Any coloring agent was not observed in the matrix. The charge controlling agent was found both in the domain phases and the matrix phases.

Then, the colored material was finely pulverized by a jet mill and classified to give a toner with a mean particle size of 8.2 μm. The yield of classification was 77 percents.

Example T2

Forty parts by weight of the domain resin and 5 parts by weight of Watching Red were melted and kneaded by a two-axis kneading and extruding machine.

Then, 55 parts by weight of matrix resin, 1 part by weight of a charge controlling agent (quarterary ammonium salt: Bontron P-51; made by Oriento Kagaku Kogyo K.K.) were melted and kneaded by a two-axis kneading and extruding machine.

A colored composition was obtained by melting and kneading 45 parts by weight of this kneaded domain resin, 55 parts by weight of the kneaded matrix resin and 8 parts by weight of the dispersion assistant by using a two-axis kneading and extruding machine.

A portion of this colored composition was placed between a piece of slide glass and cover glass. A thin film was formed by heating and melting on a hot plate, and the sample was investigated by a transmission type optical microscope. An existence of a colored dispersion phase was observed and its particles size was found to be 0.5 to 1.0 μm. The dispersion phases were dispersed finely and uniformly. Any coloring agent was not observed in the matrix. The controlling agent was found in only in the matrix phases.

Then, the colored material was finely pulverized by a jet mill and classified to give a toner with a mean particle size of 7.9 μm. The yield of classification was 79 percents.

Comparative Example T3

Irregular pulverized particles having a mean particle size of 8.2 μm were obtained by the same method as in Example T1, except that the charge controlling agent was not added.

A charge controlling agent (Nigrosine base) of 1 part by weight was adhered to the surface of the obtained pulverized particles of 100 parts by weight by means of Hybridization system (made by Nara Kikai Seisakusyo K.K.).

The toners obtained in the examples 1 and 2 and the comparative examples 1–3 were evaluated on electrification amount, scattering properties and quality of copy images.

Preparation of Developer

A micro carrier of binder type composed of 100 parts by weight of Pliolite ACL (made by Good Year K.K.), 200 parts by weight of Mapico Black (made by Titan Kogyo K.K.), 2 parts by weight of Silica #200 (made by Nippon Aerosil K.K.) and having a mean particle size of 40 μm was prepared. This magnetic micro carrier of 95 parts by weight and each toner of 5 parts by weight were placed in a container made of polypropylene to be revolved and mixed on a revolving trestle.

Measurement of Electrification Amount

An insulating film charged electrically was developed by a toner. Then, the electrification amount was calculated on the basis of the decrease voltage of the surface voltage of the film and the adhesion amount of the toner to the film. The stirring was carried out for 5 minutes and 1 hour to evaluate electrification build-up properties.

Evaluation of Scattering

Only a developing machine was taken out from a copying machine EP450 (made by Minolta Camera K.K.). The developer was placed in the developing machine. After the developing machine was driven for a specified time, the scattered toner particles were caught on white paper. The evaluation was carried out visually on the basis of adhered toner on the paper to be ranked by the symbol marks "○", "Δ" and "x".

"○": The existence of the scattered toner is not recognized.

"Δ": The existence of the scattered toner is recognized. There is no practical problem.

"x": The existence of the scattered toner is recognized. There is practical problem.

Evaluation on Copy Images

Copy images were formed on copy paper by a copying machine EP450. Fogs on the copy paper and toner scattering around copy images were observed visually to be ranked as below.

"○": not observed visually.

"x": clearly observed visually.

The results are shown table 1 below.

TABLE 1

| | charge amount [μc/g] | | scattering | image quality | |
|---|---|---|---|---|---|
| | 5 minutes | 1 hour | properties | fogs | scattering |
| EXAMPLE T1 | +22.5 | +23.4 | ○ | ○ | ○ |
| COMPARATIVE EXAMPLE T1 | +13.1 | +16.8 | X | X | X |
| COMPARATIVE EXAMPLE T2 | +15.6 | +21.8 | Δ | X | X |
| EXAMPLE T2 | +20.2 | +22.6 | ○ | ○ | ○ |
| COMPARATIVE EXAMPLE T3 | +6.7 | +12.3 | X | X | X |

It is understood that the toners of Examples are excellent in electrification build-up properties because the electrification value of 5 minutes is almost no difference from that of 1 hour. A level of electrification is enough. Toner scattering properties and copy image are satisfactory.

To the contrary, The difference between the 5 minute value and the 1 hour value is large. Toner scattering properties and copy image are not satisfactory.

MAGNETIC TONER

Hereinafter, magnetic toners are explained by concrete examples.

Domain Resin MT(Polymer of Styrene)

An aqueous medium was prepared in an autoclave of net volume of 10 litters by adding 4 kg of water, 80 g of tricalcium phosphate and 0.12 g of sodium dodecylbenzene sulfonate, and a solution prepared by dissolving 28.6 g of Perbutyl PVJ, 20 g of "NYPER B" in a mixed solution of 1.4 kg of styrene, 580 g of n-butyl acrylate and 20 g of methacrylic acid was added to the aqueous medium followed by stirring. After replacing the interior of the autoclave with nitrogen, the temperature inside the reaction system was raised to 65° C. and, while keeping the temperature for 3 hours. Further, the temperature inside the reaction system was raised to 75° C. and kept for 3 hours. Polymerization was completed by raising the temperature of the reaction system to 90° C. and keeping the temperature for 2 hours.

After cooling, the substance in the reaction system was taken out and was subjected to washing with acid and water, thereby giving 2 kg of copolymer resin of 2 kg.

The resultant resin was subjected to infrared absorption measurement to find styrene of 70 percents by wight, 29 percents by weight of n-buthylmethacrylate and 1 percent by weight of methacrylic acid. The reaction proceeded quantitatively.

Matrix Resin MT linear polyester resin
molecular weight: 3000
glass transition point: 51° C.
amorphous Dispersion Assistant MT (Modified Polyester Resin)

An aqueous medium was prepared in an autoclave of net volume of 10 litters by adding 4 kg of water, 80 g of tricalciumphosphate and 0.12 g of sodium dodecylbenzene sulfonate, and a solution prepared by dissolving 8 g of benzoyl peroxide ("NYPER B"; made by Nippon Yushi K.K.) in a mixed solution of 640 g of styrene and 160 g of n-butyl methacrylate was added to the aqueous medium followed by stirring. After placing 1200 g of polyester particles (amorphous, linear saturated polyester, glass transition point of 71.5° C., average molecular weight of about 5000) into the solution and replacing the interior of the autoclave with nitrogen, the temperature inside the reaction system was raised to 60° C. and, while keeping the temperature for 3 hours. The polyester resin particles were integrated with vinyl monomers containing the polymerization initiator described above.

Then, 11.4 g of t-butyl peroxpivalate ("PERBUTYL PV" made by Nippon Yushi K.K. Purity of about 70%) was placed into this suspension and, after raising the system temperature to 65° C. and keeping the temperature for 2 hours, polymerization of the surface of polyester resin particles was allowed to start. Polymerization was completed by raising the temperature of the reaction system to 90° C. and keeping the temperature for 3 hours.

After cooling, the substance in the reaction system was taken out and was subjected to washing with acid and water, thereby giving 2 kg of the modified resin particles.

Example MT1 (Preparation of Negatively Chargeable Toner of Polyester Type)

Twenty eight parts by weight of styrene polymer as a domain resin, 2 parts by weight of magnetic particles (EPT500; made by Toda Kogyo K.K.) and 5 parts by weight of carbon black were melted and kneaded at 140° C. by a two-axis kneading and extruding machine having vent.

A colored composition was obtained by melting and kneading 35 parts by weight of this kneaded material, 65 parts by weight of polyester resin (linear saturated polyester resin; molecular weight: 3000, glass transition point: 51° C., amorphous) as a matrix resin and 5 parts by weight of the modified polyester resin as a dispersion assistant at 140° C. by means of a two-axis kneading and extruding machine having a vent.

The order of grindability is as follows; the styrene polymer>the polyester>the modified polyester. The modified polyester is most difficult to be pulverized and has highest toughness.

A pressed sheet was formed of the colored composition. A section of the sheet was subjected to ion-etching treatment to observe domain phases by means of scanning electron microscope. The domain phases had mean particle size of 2.9 μm and were dispersed uniformly. Further, a portion of this colored composition was placed between a piece of slide glass and cover glass. A thin film was formed by heating and melting on a hot plate, and the sample was investigated by a transmission type optical microscope. The filled conditions of coloring agent were observed to be found that the coloring agent was incorporated in the domain phases.

Then, the colored material was finely pulverized by a jet mill and classified between 5 μm to 15 μm to give a toner with a mean particle size of 10 μm. The yield of classification was 70 percents.

The electrification amount of the resultant toner was measured by a blow-off method to give −21 μC/g.

Comparative Example MT1

The modified polyester and the styrene polymer, which were used in Example MT1, were not used. Only the polyester was used and magnetic particles; 2 parts by weight,
carbon black; 5 parts by weight,
polyester; 98 parts by weight were melted and kneaded together at 140° C. by a two-axis kneading and extruding machine. The content of the magnetic particles and carbon black is the same as that of Example MT1.

The resultant was evaluated in a manner similar to Example MT1. Uniform dispersions were not formed. The colored composition was pulverized similarly. The dispersion distribution was wider than that of Example MT1. The yield of classification was about 35%. The electrification amount of the resultant toner was measured by a blow-off method to give −19 μC/g, being a little lower than −21 μC/g of Example MT1.

Example MT2

A toner was prepared in a manner similar to Example MT1 except that the 13 parts by weight of the magnetic materials were added instead of 2 parts by weight in Example MT1. The dispersion conditions were the same as those of Example MT1. The yield was about 70%, being as same as that of Example MT1.

The electrification amount by a blow-off method was −18 μC/g, being lower than that of Example MT1. As the amount of the magnetic particles are increased, a true specific gravity altered. When the electrification amount is calculated referred to as the specific gravity, the electrification amount is not so different between them (the true specific gravity of toner was 1.18 and the true specific gravity of toner MT2 was 1.31.

Comparative Example MT2

The modified polyester and the styrene polymer, which were used in Example MT2, were not used. Only the polyester was used and magnetic particles; 13 parts by weight,
carbon black; 5 parts by weight,
polyester; 98 parts by weight were melted and kneaded together at 140° C. by a two-axis kneading and extruding machine. The content ratio of the magnetic particles and carbon black is the same as that of Example MT1.

The resultant was evaluated in a manner similar to Example MT1. The dispersion conditions were more irregular than those of Comparative Example MT1. The colored composition was pulverized similarly. The dispersion distribution was as broad as that of Comparative Example MT1. The yield of classification was as low a about 30%.

The electrification amount of the resultant toner was measured by a blow-off method to give −13 μC/g, being much lower than those of Example MT2 and Comparative Example MT1.

Then, scattering properties and change of electrification amount under high temperature and high humidity were evaluated on toners obtained in Example MT1, Example MT2, Comparative Example MT1 and Comparative Example MT2.

The scattering properties were evaluated by scattering ratio. A developer (5 g) containing a toner at the content 8% by weight was placed on a magnet roller (ϕ30, 1000 G) and the roller was revolved at 1000 rpm for 60 seconds. The toner scattered out of the carrier was weighed. The weight was represented by percentage.

The change of electrification amount under high temperature and high humidity was evaluated by measuring electrification amount after the toner is left under conditions such as temperature of 30° C. and humidity of 85% for 12 hours.

The results are summarized in Table 2.

TABLE 2

| | content of magnetic particles | scattered ratio of toner | change of charge amount |
|---|---|---|---|
| EXAMPLE MT1 | 1.90 wt % | 5 wt % | −19 μc/g (21)* |
| EXAMPLE MT2 | 11.21 wt % | 0 wt % | −16 μc/g (18) |
| COMPARATIVE EXAMPLE MT1 | 1.90 wt % | 13 wt % | −15 μc/g (19) |
| COMPARATIVE EXAMPLE MT2 | 11.21 wt % | 1 wt % | −6 μc/g (13) |
| STANDARD | 0% | 14 wt % | −17 μc/g (20) |

*The value inside ( ) means the one before environmental test

It is understood from Table 2 that the prevention of toner scattering and stability of electrification amount was improved.

Example MT3 (Preparation of Negatively Chargeable Toner of Polyester Type)

Thirty parts by weight of styrene polymer as a domain resin, 45 parts by weight of magnetic particles (EPT500; made by Toda Kogyo K.K.) and 3 parts by weight of carbon black were melted and kneaded at 140° C. by a two-axis kneading and extruding machine having vent.

A colored composition was obtained by melting and kneading 78 parts by weight of this kneaded material, 65 parts by weight of polyester resin (amorphous, linear saturated polyester resin; glass transition point: 51° C., molecular weight: 3000) as a matrix resin and 10 parts by weight of the modified polyester resin as a dispersion assistant at 140° C. by means a two-axis kneading and extruding machine having a vent.

The order of grindability is as follows; the styrene polymer>the polyester>the modified polyester. The modified polyester is most difficult to be pulverized and has highest toughness.

A pressed sheet was formed of the colored composition. A section of the sheet was subjected to ion-etching treatment to observe domain phases by means of scanning electron microscope. The domain phases had mean particle size of 2.9 μm and were dispersed uniformly. Further, a portion of this colored composition was placed between a piece of slide glass and cover glass. A thin film was formed by heating and melting on a hot plate, and the sample was investigated by a transmission type optical microscope. The filled conditions of coloring agent were observed to be found that the coloring agent was incorporated in the dispersion phases.

Then, the colored material was finely pulverized by a jet mill and classified between 5 μm to 15 μm to give a toner with a mean particle size of 20 μm. The yield of classification was about 65 percents.

Comparative Example MT3

The modified polyester and the styrene polymer, which were used in Example MT3, were not used. Only the polyester was used and magnetic particles; 45 parts by weight, carbon black; 3 parts by weight, polyester; 105 parts by weight were melted and kneaded together at 140° C. by a two-axis kneading and extruding machine. The content ratio of the magnetic particles and carbon black is almost the same as that of Example MT1.

The resultant was evaluated in a manner similar to Example MT3. The uniform dispersion was not formed. The colored composition was pulverized similarly. The dispersion distribution was broader than that of Example MT3. The yield of classification was as low a about 35%.

With respect to toners obtained in Example MT3 and Comparative Example MT3, electrical resistance (Ωcm), electrification amount, transportability, influences of durability test on the surface of a photosensitive member were evaluated. The results were summarized in Table 3.

TABLE 3

| | EXAMPLE MT3 | COMPARATIVE EXAMPLE MT3 |
|---|---|---|
| electrical resistance (Ω/cm) | more than $10^{15}$ | $10^{12}$~$10^{13}$ |
| charge amount (A) | −16 μc/g | −10 μc/g |
| charge amount (B) | −13 μc/g | 4 μc/g |
| transportability | normal | some toner particles did not move |
| surface conditions at durability test | normal | damage, toner adhesion |

In Table 3, the electrical resistance was measured by means of impedance bridge method.

The electrification amount (A) was measured by means of a blow-off method.

The electrification amount (B) was measured similarly after left under high humid environments (30° C., 85%RH) for 12 hours.

The transportability was evaluated by placing toner particles on a magnet roller (ϕ30–1000G) and observing visually the movement of toner particles when only the magnet inside the magnet roller was revolved with manual operation.

The surface of the photosensitive member was evaluated visually after durability test with respect to 20000 times of copy by use of a copying machine EP-350 (made by Minolta Camera K.K.) remodeled for mono-component developing system.

The toner of Comparative Example MT3 prepared by a conventional method is poor in uniform dispersion of magnetic particles, low in electrical resistance. Therefore, electrification amount is low and chargeability is poor particularly under high humid conditions.

As liberated magnetic particles are liable to be formed in a pulverizing process, they may cause damages on the surface of photosensitive member.

CARRIER

Hereinafter, the present invention with respect to a carrier according to the invention is explained by concretes examples.

Domain Resin C (Polymer of Styrene)

An aqueous medium was prepared in an autoclave of net volume of 10 litters by adding 4 kg of water, 80 g of tricalcium phosphate and 0.12 g of sodium dodecylbenzene sulfonate, and a solution prepared by dissolving 28.6 g of Perbutyl PV, 20 g of "NYPER B" in a mixed solution of 1.4 kg of styrene, 580 g of n-butyl methacrylate and 20 g of methacrylic acid was added to the aqueous medium followed by stirring. After replacing the interior of the autoclave with nitrogen, the temperature inside the reaction system was raised to 65° C. and, while keeping the temperature for 3 hours. Further, the temperature inside the reaction system was raised to 75° C. and kept for 3 hours. Polymerization was completed by raising the temperature of the reaction system to 90° C. and keeping the temperature for 2 hours.

After cooling, the substance in the reaction system was taken out and was subjected to washing with acid and water, thereby giving 2 kg of copolymer resin of 2 kg.

The resultant resin was subjected to infrared absorption measurement to find styrene of 70 percents by weight, 29 percents by weight of n-buthylmethacrylate and 1 percent by weight of methacrylic acid. The reaction proceeded quantitatively.

Matrix Resin C linear polyester resin molecular weight: 3500 glass transition point: 56° C.

amorphous

Dispersion Assistant C (Modified Polyester Resin)

An aqueous medium was prepared in an autoclave of net volume of 10 litters by adding 4 kg of water, 80 g of tricalcium phosphate and 0.12 g of sodium dodecylbenzene sulfonate, and a solution prepared by dissolving 8 g of benzoyl peroxide ("NYPER B"; made by Nippon Yushi K.K.) in a mixed solution of 640 g of styrene and 160 g of n-butyl methacrylate was added to the aqueous medium followed by stirring. After placing 1200 g of polyester particles (amorphous, linear saturated polyester, glass transition point of 71.5° C., average molecular weight of about 5000) into the solution and replacing the interior of the autoclave with nitrogen, the temperature inside the reaction system was raised to 60° C. and, while keeping the temperature for 3 hours. The polyester resin particles were integrated with vinyl monomers containing the polymerization initiator described above.

Then, 11.4 g of t-butyl peroxpivalate ("PERBUTYL PV" made by Nippon Yushi K.K.; purity of about 70%) was placed into this suspension and, after raising the system temperature to 65° C. and keeping the temperature for 2 hours, polymerization of the surface of polyester resin particles was allowed to start. Polymerization was completed by raising the temperature of the reaction system to 90° C. and keeping the temperature for 3 hours.

After cooling, the substance in the reaction system was taken out and was subjected to washing with acid and water, thereby giving 2 kg of the modified resin particles.

Example C1

Thirty parts by weight of styrene polymer as a domain resin and 150 parts by weight of magnetic particles (maximum magnetism:70 emu/g, residual magnetism:16 emu/g, holding power:1200e) were melted and kneaded at 140° C. by a two-axis kneading and extruding machine having vent.

One hundred and eighty parts by weight of this kneaded material, 50 parts by weight of polyester resin (amorphous, linear polyester; glass transition point: 56° C., molecular weight: 3500) containing TiO2 at 50 wt % as a matrix resin and 5 parts by weight of the modified polyester resin as a dispersion assistant were melted and kneaded at 140° C. by means of a two-axis kneading and extruding machine having a vent.

The order of grindability is as follows; the styrene polymer>the polyester>the modified polyester. The modified polyester is most difficult to be pulverized and has highest toughness.

Then, the melted and kneaded material was finely pulverized by a jet mill and classified between 50 μm to 100 μm to give a white carrier with a mean particle size of 70 μm.

Comparative Example C1

The modified polyester and the styrene polymer, which were used in Example C1, were not used. Only the polyester was used and magnetic particles: 150 parts by weight, polyester: 60 parts by weight, TiO2 (white pigment): 25 parts by weight were melted and kneaded together at 140° C. by a two-axis kneading and extruding machine. The content ratio of the magnetic particles and the white pigment is the same as that of Example C1.

The resultant kneaded material was pulverized and classified to give carrier particles having mean particle size of 70 μm. The carrier is gray black, being far from the aimed color.

Comparative Example C2 (not phase separated)

White pigment was added as far as kneading can be carried out in a manner similar to Comparative Example C1. Thereby the amount of the white pigment contained was increased to make the carrier white. The composition was composed of;

magnetic particles: 150 parts by weight, polyester: 60 parts by weight,

TiO2 (white pigment): 100 parts by weight

The kneaded material was pulverized and classified in a manner similar to Example C1 to give carrier particles of mean particle size of 70 μm.

The particle size distribution of the pulverized material was broad. The classification yield was low. The color of the carrier was black-gray, being not the aimed color.

Comparative Example C3

A carrier was prepared in a manner similar to Comparative Example C1 except that TiO2 was not used.

(Evaluation)

The reflection density of films prepared by hot-pressing the carrier obtained Example C1 and Comparative Examples C1–C3 were shown in Table 4.

TABLE 4

| | reflection density |
|---|---|
| copy paper (white) | 0.08 |
| EXAMPLE | 0.33 |
| COMPARATIVE EXAMPLE C1 | 1.15 |
| COMPARATIVE EXAMPLE C2 | 0.84 |
| COMPARATIVE EXAMPLE C3 | 1.30 |

The reflection density was measured by Macbeth RD-514 (trade mark).

The magnetic particles are contained in the domain resin phase. The white pigments are contained in the matrix resin phase. The toughest material is interposed between the domain resin phase and the matrix resin phase. The surface portions of pulverized particles are formed of the matrix resin containing the dispersed white pigments. Therefore, the black color of the magnets inside the toner is hidden.

Example C2

Polyester resin (amorphous, linear polyester; glass transition point: 51° C., molecular weight: 3000) was used as a matrix resin. A domain resin and a dispersion assistant were the same as those used in Example C1.

Thirty five parts by weight of styrene polymer as a domain resin and 150 parts by weight of magnetic particles (maximum magnetism:70 emu/g, residual magnetism:16 emu/g, holding power:120 Oe) were melted and kneaded at 140° C. by a two-axis kneading and extruding machine having vent.

This kneaded material of 190 parts by weight, polyester resin (matrix resin )(linear polyester resin; molecular weight: 3000, glass transition point: 51° C., amorphous) of 40 parts by weight and modified polyester (dispersion assistant) of 10 parts by weight were melted and kneaded at 140° C. by means of a two-axis kneading and extruding machine having a vent.

A pressed sheet was formed of the kneaded composition. A section of the sheet was subjected to ion-etching treatment to observe domain phases by means of scanning electron microscope. The domain phases had mean particle size of 1.0–2.0 μm and were dispersed uniformly. Further, a portion of this kneaded composition was placed between a piece of slide glass and cover glass. A thin film was formed by heating and melting on a hot plate, and the sample was investigated by a transmission type optical microscope. The filled conditions of additives were observed to be found that the magnetic particles were almost incorporated in the domain phases although some magnetic particles are found in the matrix (polyester) phases.

Then, the kneaded material was finely pulverized by a jet mill and classified between 50 μm to 100 μm to give carrier particles of mean particle size of 70 μm. The yield of classification was about 50 percents.

Comparative Example C4

The modified polyester and the styrene polymer, which were used in Example C1, were not used. Only the polyester was used and magnetic particles; 150 parts by weight, polyester; 85 parts by weight were melted and kneaded together at 140° C. by a two-axis kneading and extruding machine. The content ratio of the magnetic particles is the same as that of Example C2.

The resultant was evaluated in a manner similar to Example C1. The dispersion conditions were not uniform. The kneaded composition was pulverized and classified in a manner similar to Example C2. The dispersion distribution was very broad. The yield of classification was as low as about 20%.

With respect to toners obtained in Example C2 and Comparative Example C4, electrical resistance (Ωcm), electrification amount of toner, carrier scattering and carrier development were evaluated. The results were summarized in Table 4.

TABLE 5

| | EXAMPLE C2 | COMPARATIVE EXAMPLE C2 |
|---|---|---|
| electrical resistance (Ω/cm) | $10^{14}$~$10^{15}$ | $10^{10}$~$10^{12}$ |
| charge amount of +toner (A) | 20 μc/g | 13 μc/g |
| charge amount of +toner (B) | 18 μc/g | 7 μc/g |
| carrier scattering | almost none | remarkable |
| carrier development | not observed | observed |

In Table 5, the electrical resistance was measured by means of impedance bridge method.

The electrification amount (A) was measured by means of a blow-off method. The toner used for this measurement was a positively chargeable one prepared with styrene resin, carbon black and a charge controlling agent.

The electrification amount (B) was measured similarly after left under high humid environments (30° C., 85%RH) for 12 hours.

The carrier scattering was evaluated by placing carrier particles of 5 g on a magnet roller (ϕ30–1000G) and measuring carrier amount scattered from the magnet roller when the magnet roller was revolved at 1000 rpm for 60 seconds.

The carrier development was carried out as follows. The carrier particles were placed on a developing sleeve. The voltage of 500 V (positive and negative) was applied to the counter electrode. Then it was observed whether the carrier particles adhered to the electrode by force of electrostatic induction. The distance between the sleeve and the electrode was adjusted to 1 mm.

The conventional carrier of Comparative Example 4C was poor in uniform dispersibility of the carrier particles. The charging ability was poor. Under high humid environment, the electrification amount decreased and the carrier particles were liable to be developed. Therefore, the surface of a photosensitive member is damaged, an edge of blade cleaning member is damaged and carrier particles are transferred onto copy paper to form a image noises.

Developing Method

Hereinafter a new and preferable developing method is explained by use of a carrier of the present invention.

White carrier DM used in the present developing method.

In this preparation of white carrier, the domain resin C, the matrix resin C and the matrix resin C were used.

Thirty parts by weight of styrene polymer as a domain resin and 150 parts by weight of magnetic particles (maximum magnetism:70 emu/g, residual magnetism:16 emu/g, holding power:120 Oe) were melted and kneaded at 140° C. by a two-axis kneading and extruding machine having vent.

One hundred and eighty parts by weight of this kneaded material, 50 parts by weight of polyester resin (amorphous, linear polyester; glass transition point: 56° C., molecular weight: 3500) containing white pigment of titanium oxide pigment at 50 wt % as a matrix resin and 5 parts by weight of the modified polyester resin as a dispersion assistant were melted and kneaded at 140° C. by means of a two-axis kneading and extruding machine having a vent.

The Izot impact strength of the polyester is weakest among the styrene polymer, the polyester and the modified polyester. The pulverizing stress is liable to be concentrated on the polyester in the following pulverizing process.

Then, the melted and kneaded material was finely pulverized by a jet mill and classified between 15 μm to 65 μm to give a white carrier with a mean particle size of 40 μm.

The resultant carrier was melted to form a sample for measuring whiteness degree by Macbeth reflection densitometer. The whiteness degree was 0.34, being satisfactory.

Conventional Carrier

The modified polyester and the styrene polymer, which were used in White carrier DM above, were not used. Only the polyester was used and magnetic particles: 150 parts by weight, polyester: 85 parts by weight, were melted and kneaded together at 140° C. by a two-axis kneading and extruding machine.

The resultant kneaded material was pulverized and classified similarly to give carrier particles having mean particle size of 40 μm. The reflection density of the obtained carrier was measured similarly to give 1.36. The color was almost black.

Developing Machine

Figure 4:
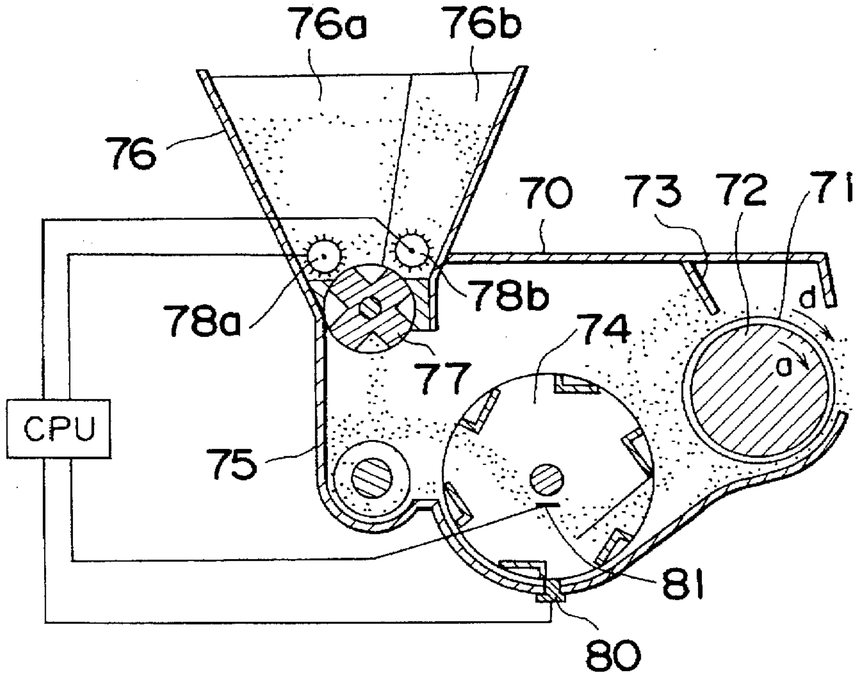
FIG. 4 shows a schematic sectional view of a developing machine.

FIG. 4 shows a sectional view of a developing machine. The reference number (76) points out a supplying hopper positioned at the rear of a developing tank (70). The hopper contains a toner and a carrier separately. The toner is contained in a space **(76*a*). A detecting means of a toner content (80) (a sensor to magnetism) is set at the bottom of a bucket roller (74). When the toner content becomes low, the detecting means (80) detects the content of the toner. A signal is given to supply toner. A CPU receives the signal and gives a command to supply toner. Then, according to a signal by CPU, a first roller (78*a*) and a second roller (77)** revolve to supply the toner.

A starting developer is contained in a space **(76*b*). A detecting means of a carrier volume (81) (film sensor to displacement) gives a signal to supply a developer when the amount of the developer becomes low. A CPU receives the signal and gives a command to supply the developer. Then, according to the signal by CPU, a first roller (78*b*) and a second roller (77)** revolve to supply the developer.

Figure 5:
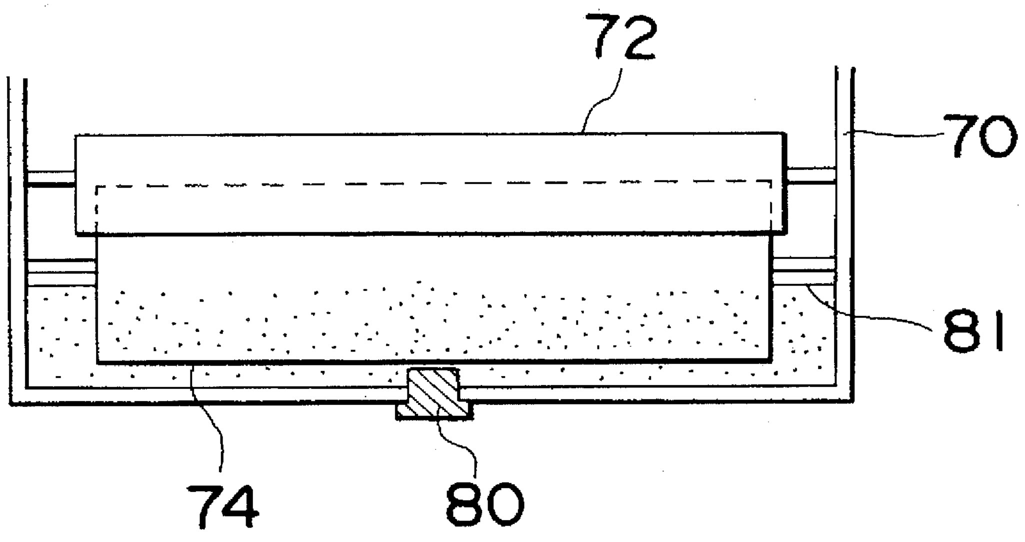
FIG. 5 is shown to explain a position of a sensor.

FIG. 5 shows the positions of the two sensors (80) and (81) when viewed from a developing sleeve (72).

Comparative Example DM1

The conventional toner (black) was mixed with a red toner at 8 percents by weight of toner to prepare a developer. The developer of 250 g was charged in the developing machine of FIG. 4. A character manuscript of black-white ratio of 12% was used. A durability test with respect to copy was carried out under usual developing conditions (−150 V of a developing bias voltage). A developer was not supplied. In this time, the amount of carrier consumption was 0.2 mg/one sheet of paper (A4). Some carrier adhesions were observed around the copy images and on the background but did not affect the quality of copy images adversely. However, when the developing process was further repeated, the surface of carrier was polluted by toner. Toner fogs were formed on the background. After about 25000 times of copy, the developer had to be exchanged.

Comparative Example DM2

The bias voltage was raised gradually compared with that of Comparative Example DM1 to study the influences on carrier consumption and copy images. When the carrier consumption reached 0.5 mg a sheet of copy paper (A4), the carrier adhesion around the copy images became particularly remarkable. The carrier adhesions could to be disregarded from the view point of the deterioration of copy images.

Comparative Example DM3

The white carrier was used in this comparative example. The bias voltage was set at −250 V. In these conditions, the durability test with respect to copy was carried out. In this time, the carrier consumption was 3.1 mg a sheet of copy paper (A4). When observed by a test glass, many adhesions of carrier were found around copy images and on the back ground of copy paper. But, the carrier was white, the adhesions hardly affected adversely the quality of copy images. After about 24000 times of copy, the developer was not supplied regularly, so that irregular density of copy images became remarkable. The carrier was polluted. Fogs of toner were more remarkable than Comparative Example DM1. Generally, the phenomena as above mentioned appear when the amount of a two-component developer is very small. When the amount is so large, a high driving torque is needed and the developer can not be mixed and stirred sufficiently in a developing machine. A toner is charged poorly to cause fogs and pollution by scattering. The smooth flow of a developer is disturbed so that the developer comes to be supplied irregularly. Therefore, every developing machine has a most suitable capacity of developer. The most suitable amount of developer of the developing machine used in this example is within the range of 170 g–250 g.

Example DM1

The durability test with respect to copy was carried out in a manner similar to Comparative Example DM3 except that an amount of developer was detected to supply a starting developer automatically in such a amount that carrier was consumed.

The carrier consumption was 3.2 mg a sheet of paper (A4), being almost the same as that of Comparative Example DM3. But, as a carrier was supplied constantly, the pollution by carrier was hardly occurred even after 60,000 times of copy. The irregular density of copy images caused by decrease of developer was not observed. The troublesome work to exchange the developer every 20,000 times of copy is not necessary.

What is claimed is:

1. A carrier for electrophotography comprising:

a plurality of domains comprising a domain resin and magnetic particles;

a matrix comprising a coloring agent and a matrix resin having a low compatibility with the domain resin; and a dispersion assistant having a high compatibility with both the domain resin and the matrix resin and having an Izod impact value higher than that of the matrix resin, said domains being dispersed in the matrix resin with the dispersion assistant interposed, said dispersion assistant composed of a copolymer comprising the domain resin component and the matrix resin component;

said carrier having a size distribution in a range of from 50 micrometers to 100 micrometers.

2. A carrier of claim 1, wherein the amount of the matrix resin is from 5 to 40 percent by weight on the basis of the total amount of carrier.

3. A carrier of claim 1, wherein the particle size of the magnetic particles is from 0.1 to 3.0 μm.

4. A carrier of claim 1, wherein the amount of the magnetic particles is from 30 to 90 percent by weight on the basis of the total amount of carrier.

5. A carrier of claim 1, wherein the amount of the dispersion assistant is at least 0.5 percent by weight on the basis of the total amount of carrier.

6. A carrier of claim 1, wherein the amount of the coloring agent is from 40 to 65 percent by weight on the basis of the matrix resin.

7. A carrier of claim 1, wherein the coloring agent has a primary particle size of from 0.05 to 0.5 μm.

8. A carrier for electrophotography comprising:

a plurality of domains comprising a domain resin and magnetic particles;

a matrix comprising a coloring agent and a matrix resin having low compatibility with the domain resin; and a dispersion assistant having an Izod impact value higher than that of the matrix resin, compatibility of the dispersion assistant with the matrix resin or the domain resin being higher than that between the matrix resin and the domain resin, said domains being dispersed in the matrix resin with the dispersion assistant interposed, said dispersion assistant composed of a copolymer comprising the domain resin component and the matrix resin component;

said carrier having a size distribution in a range of from 50 micrometers to 100 micrometers.

9. A carrier of claim 8, wherein the amount of the matrix resin is from 5 to 40 percent by weight on the basis of the total amount of the carrier.

10. A carrier of claim 8, wherein the particle size of the magnetic particles is from 0.1 to 3.0 μm.

11. A carrier of claim 8, wherein the amount of the magnetic particles is from 30 to 90 percent by weight on the basis of the total amount of carrier.

12. A carrier of claim 8, wherein the amount of the dispersion assistant is at least 0.5 percent by weight on the basis of the total amount of carrier.

13. A carrier of claim 8, wherein the amount of the coloring agent is from 40 to 65 percent by weight on the basis of the matrix resin.

14. A carrier of claim 8, wherein the coloring agent has a primary particle size of from 0.05 to 0.5 μm.

15. A carrier for electrophotography comprising:

a plurality of domains comprising a domain resin and magnetic particles;

a matrix comprising a coloring agent and a matrix resin having a low compatibility with the domain resin; and a dispersion assistant composed of a copolymer comprising a component of the matrix resin and a component of the domain resin, said dispersion assistant having an Izod impact value higher than that of the matrix resin, said domains being dispersed in the matrix resin with the dispersion assistant interposed, said carrier having a size distribution in a range of from 50 micrometers to 100 micrometers.

16. A carrier of claim 15, wherein the copolymer is obtained by graft-copolymerization of a resin containing a monomer composing the domain resin with a monomer composing the matrix resin.

17. A carrier of claim 15, wherein the copolymer is obtained by graft-copolymerization of a resin containing a monomer composing the matrix resin with a monomer composing the domain resin.

18. A carrier for charging a toner comprising:

a matrix resin;

a domain resin dispersed in the matrix;

an amount from 30 percent to 90 percent by weight based on the total amount of the carrier of magnetic compound dispersed into the domain resin, said carrier having a size distribution in a range of from 50 micrometers to 100 micrometers; and a dispersion assistant interposed between the matrix resin and domain resin, said dispersion assistant composed of copolymer comprising the domain resin and the matrix resin component.

* * * * *